US007590080B2

(12) United States Patent
Rudolf et al.

(10) Patent No.: US 7,590,080 B2
(45) Date of Patent: Sep. 15, 2009

(54) CHANNEL ASSIGNMENT TO MAXIMIZE BATTERY EFFICIENCY IN WIRELESS SYSTEMS

(75) Inventors: Marian Rudolf, Montreal (CA);
Stephen G. Dick, Nesconset, NY (US);
Liliana Czapla, Jackson Heights, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/902,370

(22) Filed: Jul. 29, 2004

(65) Prior Publication Data

US 2005/0099989 A1 May 12, 2005

Related U.S. Application Data

(60) Provisional application No. 60/518,147, filed on Nov. 7, 2003.

(51) Int. Cl.
*H04W 4/00* (2009.01)
(52) U.S. Cl. .................. 370/311; 370/349; 370/345; 370/347
(58) Field of Classification Search .......... 370/311, 370/349, 522, 345, 347; 455/515, 127.5, 455/343.2, 343.5, 343.1, 450; 340/7.32–7.38
See application file for complete search history.

(56) References Cited

U.S. PATENT DOCUMENTS

| 5,446,453 | A | * | 8/1995 | Nagamoto et al. .......... 370/311 |
| 5,539,804 | A | | 7/1996 | Hong |
| 5,796,726 | A | | 8/1998 | Hassan et al. |
| 5,844,894 | A | | 12/1998 | Dent |
| 5,930,248 | A | | 7/1999 | Langlet et al. |
| 2002/0181436 | A1 | | 12/2002 | Mueckenheim et al. |
| 2003/0039230 | A1 | | 2/2003 | Ostman et al. |
| 2003/0076799 | A1 | * | 4/2003 | Kwak et al. ................. 370/335 |
| 2003/0112773 | A1 | * | 6/2003 | Lee et al. .................... 370/318 |
| 2004/0029586 | A1 | * | 2/2004 | Laroia et al. ................ 455/434 |
| 2004/0077368 | A1 | * | 4/2004 | Anderson .................... 455/522 |
| 2005/0068990 | A1 | * | 3/2005 | Liu ............................. 370/516 |
| 2005/0107105 | A1 | * | 5/2005 | Wakabayashi .............. 455/515 |

(Continued)

FOREIGN PATENT DOCUMENTS

EP    1 045 559    4/1999

(Continued)

OTHER PUBLICATIONS

CWTS STD-TDD-25.224, China Wireless Telecommunication Standard (CWTS) Technical Specification, Mar. 2003, Working group 1, Release 5, V5.3.0, entire document.*

(Continued)

*Primary Examiner*—Ian N Moore
(74) *Attorney, Agent, or Firm*—Volpe and Koenig, P.C.

(57) ABSTRACT

A method for maximizing battery efficiency of a wireless transmit/receive unit (WTRU) is disclosed. In one embodiment, a predetermined number of high-speed shared control channels (HS-SCCHs) are identified and WTRUs are instructed to monitor the HS-SCCHs according to a predetermined schedule. The predetermined schedule can include monitoring the HS-SCCHs in the same timeslot, either a timeslot just for the HS-SCCHs or a timeslot utilized by another channel.

10 Claims, 4 Drawing Sheets

U.S. PATENT DOCUMENTS

2005/0176435 A1    8/2005    Fauconnier et al.

FOREIGN PATENT DOCUMENTS

WO    95/34178    12/1995
WO    03/061308    7/2003

OTHER PUBLICATIONS

Third Generation Partnership Project, "Technical Specification Group Radio Access Network; Physical Channels and Mapping of Transport Channels (FDD) (Release 5)," 3GPP TS 25.211 v5.4.0 (Jun. 2003).

Third Generation Partnership Project, "Technical Specification Group Radio Access Network; Physical Channels and Mapping of Transport Channels (FDD) (Release 5)," 3GPP TS 25.211 v5.5.0 (Sep. 2003).

Third Generation Partnership Project, "Technical Specification Group Radio Access Network; Physical Channels and Mapping of Transport Channels (FDD) (Release 5)," 3GPP TS 25.211 v5.4.0 (Jun. 2003).

Third Generation Partnership Project, "Technical Specification Group Radio Access Network; Physical Channels and Mapping of Transport Channels (FDD) (Release 5)," 3GPP TS 25.211 v5.5.0 (Sep. 2003).

* cited by examiner

CHANNEL ASSIGNMENT TO MAXIMIZE BATTERY EFFICIENCY IN WIRELESS SYSTEMS

CROSS REFERENCE TO RELATED APPLICATION(S)

This application claims benefit of U.S. Provisional Application No. 60/518,147, filed Nov. 7, 2003, which is incorporated by reference as if fully set forth herein.

FIELD OF INVENTION

The present invention relates to wireless communication systems, and more particularly, to a method for assigning channels in wireless systems employing high-speed downlink packet access (HSDPA).

BACKGROUND

Release 5 UMTS (universal mobile telecommunication system) frequency division duplex (FDD) and time division duplex (TDD) modes have incorporated a feature called high-speed downlink packet access (HSDPA) for improving throughput, latency, and spectral efficiency in the downlink (DL). The principle of HSDPA is to schedule packet transmissions on the air interface to different mobile units as a function of their instantaneous experienced radio and service conditions in a dynamic manner (i.e., fast; for example, every 2 ms in FDD or every 10 ms in TDD). Key functionalities of HSDPA in both FDD and TDD modes include: fast re-transmissions (hybrid automatic repeat request (ARQ)) of DL packets received in error over the air interface (Uu), fast uplink (UL) notification of DL packets received in error (acknowledgements/negative acknowledgements), fast channel feedback in the UL on a wireless transmit/receive unit's (WTRU's) DL channel state, and fat-pipe scheduling for efficiently servicing many users in the DL. This functionality, i.e., the fast, dynamic HSDPA packet scheduler, is located in the base station (i.e., the Node B) and operates in a rather autonomous manner from the radio network controller (RNC).

In a TDD system, the RNC allocates a certain number of timeslots for the usage of HSDPA data channels, i.e., the HS-DSCH (high-speed downlink shared channel), to each cell. The RNC communicates to the Node B which timeslots and which set of spreading codes in each of the timeslots can be used for the HS-DSCH by means of Iub/Iur signaling. The RNC subsequently passes control to the Node B on when to send DL packets in the selected timeslots and spreading codes.

Furthermore, for HSDPA operation in TDD, DL and UL control signaling from the Node B to the WTRU and from the WTRU to the RNC is important. Two types of HSDPA control channels exist, the HS-SCCH (high-speed shared control channel) for fast DL signaling and the HS-SICH (high-speed shared information channel) for fast UL signaling. Both the HS-SCCH and the HS-SICH occupy one resource unit (one spreading factor 16 code in one timeslot).

The DL HS-SCCH is used by the Node B to alert a WTRU in a group of WTRUs that high-speed data is scheduled for it on the HS-DSCH. One particular WTRU can monitor up to four HS-SCCHs in parallel. It is noted that more than four HS-SCCHs can be set up in a cell.

The UL HS-SICH is used by a WTRU to inform the Node B of the outcome of a HS-DSCH decoding attempt, i.e., data reception successful/not successful. Any HS-SICH is unambiguously associated with the occurrence of a particular HS-SCCH (fixed timing relationship and code mapping) in order to allow the Node B to establish a clear relationship between a WTRU which has been addressed on the HS-SCCH and the same WTRU's corresponding UL transmission after HS-DSCH decoding.

For HSDPA operation in both FDD and TDD, the RNC maintains a permanent low-rate UL and DL signaling connection to the WTRU by means of a dedicated channel (DCH). This so-called associated DCH conveys radio resource control (RRC) information (for example, handover commands or measurement data) and is also used in the UL for conveying user plane data, for example TCP/IP acknowledgements. This associated DCH is identical from a functional point-of-view to conventional UMTS R99 or R4 dedicated channels, even if a much lower data rate (i.e., 3.4 kbps) is needed.

Channel configuration for HSDPA, i.e., the allocation of the HS-DSCH, HS-SCCH, and HS-SICH channels necessary for HSDPA operation and associated UL and DL DCHs to timeslots and spreading codes, is done by the RNC at connection set-up. The RNC informs the WTRU of channel configurations by means of RRC signaling and the Node B by means of NBAP (Node B application part) signaling over the Iub/Iur network interfaces.

The high number of channels (i.e., up to four DL HS-SCCHs, one DL associated DCH, one UL associated DCH, and eventually an UL HS-SICH) which a WTRU must regularly receive or send while in HSDPA service constitute a significant burden on its power consumption and therefore its battery efficiency. This is especially relevant during sleep mode, i.e., the short (one to several tens or more idle frames) but frequent HSDPA transmission pauses when other WTRUs are being serviced by the Node B packet scheduler.

The determining factor of overall WTRU power consumption is the length of time that its radio frequency (RF) part (power amplifiers, frequency oscillation stage, intermediate frequency converters, and filters) is powered on, such as necessary for receiving in a timeslot containing data or for sending in a timeslot containing data. A WTRU's baseband operation parts (digital DSPs, ASICs, etc.) are less demanding in terms of power consumption, and baseband parts are often operating on background tasks or decoding while the RF part is powered off. Typically, approximately 80% of WTRU battery power consumption goes into the WTRU's RF part when both the baseband part and the RF part are simultaneously active.

The high number of simultaneous channels necessary to support HSDPA service therefore poses a challenge in how to allocate the channels in a way to minimize a WTRU's power consumption.

SUMMARY

A method for maximizing battery efficiency of a wireless transmit/receive unit (WTRU) is disclosed. In one embodiment, a predetermined number of high-speed shared control channels (HS-SCCHs) are identified and WTRUs are instructed to monitor the HS-SCCHs according to a predetermined schedule. The predetermined schedule can include monitoring the HS-SCCHs in the same timeslot, either a timeslot just for the HS-SCCHs or a timeslot utilized by another channel.

A system for maximizing the battery efficiency of a WTRU in a wireless communication system having a RNC includes a high-speed downlink packet access allocation controller located at the RNC. The allocation controller allocates channels in one of three ways: (1) HS-SCCHs monitored by the WTRU to the same DL timeslot, (2) HS-SCCHs monitored by the WTRU to a DL timeslot in which the WTRU receives a DL DCH, or (3) a HS-SICH to a UL timeslot in which the WTRU sends a UL DCH, the HS-SICH being allocated after the WTRU decodes a HS-DSCH.

BRIEF DESCRIPTION OF THE DRAWINGS

A more detailed understanding of the invention may be had from the following description of a preferred embodiment, given by way of example and to be understood in conjunction with the accompanying drawings, wherein.

DETAILED DESCRIPTION OF THE PREFERRED EMBODIMENTS

Hereafter, a wireless transmit/receive unit (WTRU) includes, but is not limited to, a user equipment, a mobile station, a fixed or mobile subscriber unit, a pager, or any other type of device capable of operating in a wireless environment. When referred to hereafter, a base station includes, but is not limited to, a Node B, a site controller, an access point, or any other type of interfacing device in a wireless environment.

In the present invention, it is proposed to maximize a WTRU's battery efficiency in HSDPA service by the RNC allocating a TDD HSDPA WTRU's channels (HS-SCCHs to monitor, DL and UL associated DCHs, and HS-SICHs) in a way such that a WTRU's RF part on-time (as the overall determining factor) is minimized. It is noted that once (or at most twice) every frame, the WTRU must receive the primary common control physical channel (P-CCPCH) or the secondary beacon timeslot for deriving pathloss measurements for setting the UL transmission power.

By means of the freedom given to the RNC to perform HSDPA channel allocations to an individual WTRU, up to all four HS-SCCHs that a particular WTRU can be required to monitor every frame can be put into the same timeslot. In addition, every HS-SICH resource (spreading factor 16 code in a particular timeslot) corresponds to precisely one HS-SCCH, but independent associations between a HS-SCCH and a HS-SICH for different WTRUs can be set by the RNC by means of radio resource control (RRC) signaling.

Figure 1:
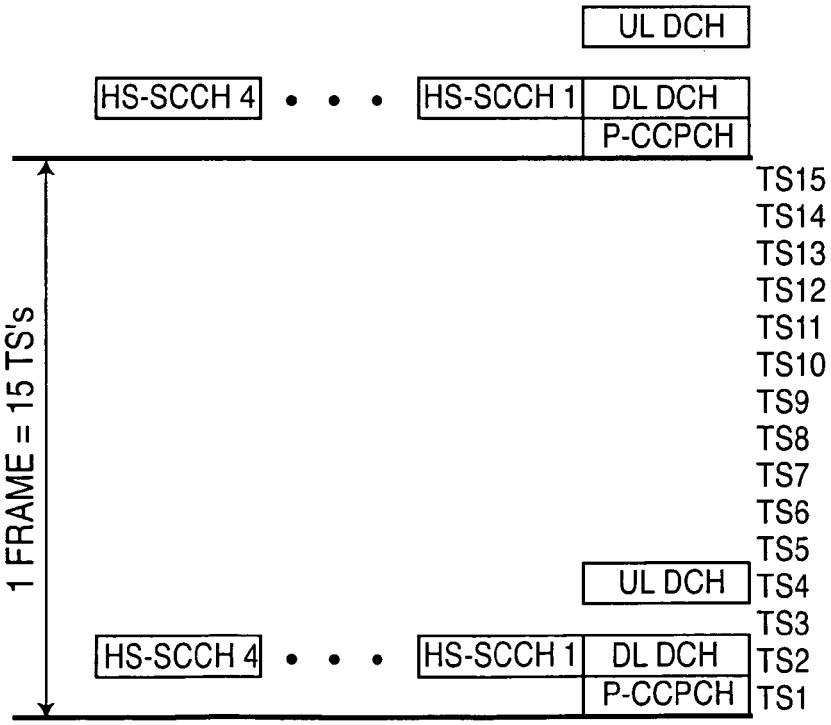
FIG. 1 is a timeslot diagram for channel monitoring in accordance with a first and a second embodiment of the present invention.

In a first embodiment of the method, shown in FIG. 1, WTRU power consumption is decreased by the RNC allocating some or all of the HS-SCCHs. A WTRU regularly monitors the same DL timeslot. In a second embodiment of the method, also shown in FIG. 1, WTRU power consumption is decreased by the RNC allocating some or all of the HS-SCCHs. A WTRU regularly monitors the same timeslot in which it already regularly receives its associated DL DCH.

The on-time of the RF part using the methods according to the first and second embodiments could be as low as three timeslots (out of 15), i.e., the P-CCPCH timeslot, the DL DCH timeslot, and the UL DCH timeslot, as compared to potentially up to seven out of 15 timeslots if every HS-SCCH to be monitored were allocated to a different DL timeslot. A slightly modified version of the second embodiment is to allocate HS-SCCHs to the P-CCPCH (or secondary beacon timeslot) instead, because the WTRU's RF part will already be active for measuring DL pathloss for its UL transmissions.

Figure 2:
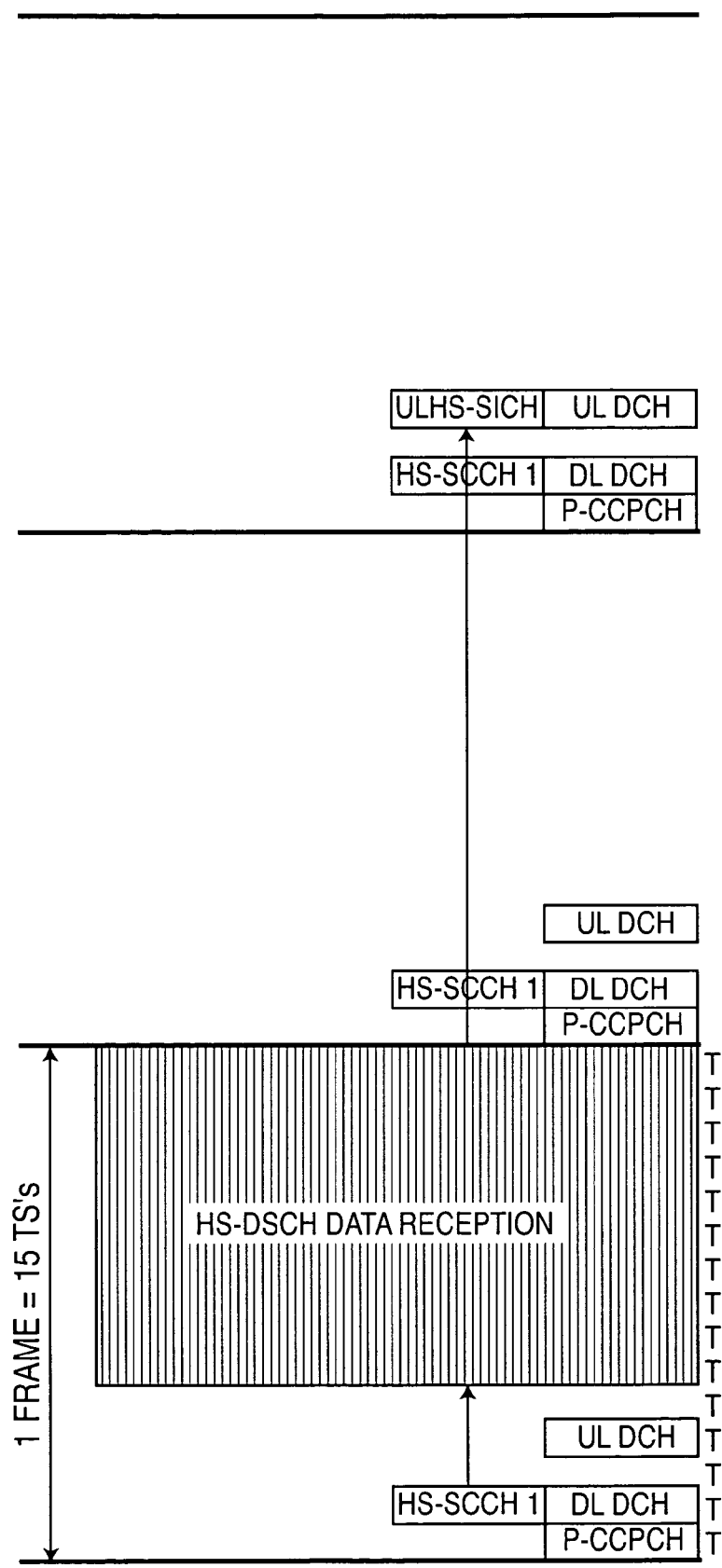
FIG. 2 is a timeslot diagram for channel monitoring in accordance with a third embodiment of the present invention.

In a third embodiment of the method, shown in FIG. 2, WTRU power consumption is decreased by the RNC allocating the HS-SICH, after a HS-DSCH decoding attempt, to a UL timeslot where the WTRU regularly sends its associated UL DCH (see Frame 3 of FIG. 2). The HS-SICH is sent in Frame 3, instead of Frame 2, because the standard guarantees that there will be a minimum amount of processing time allocated to processing the data in the HS-DSCH. The HS-SICH containing the acknowledgement or negative acknowledgement for data in a particular HS-DSCH is therefore not sent in the same frame as the HS-DSCH is received, but typically two frames later (as shown in FIG. 2). It is noted that the standard allocates approximately 15-16 timeslots for TDD mode, and approximately 7.5 timeslots for FDD mode. The HS-SICH allocation can be performed by the RNC by means of RRC signaling at setup, choosing the association of UL HS-SICHs to a WTRU's DL HS-SCCHs correspondingly.

Figure 3:
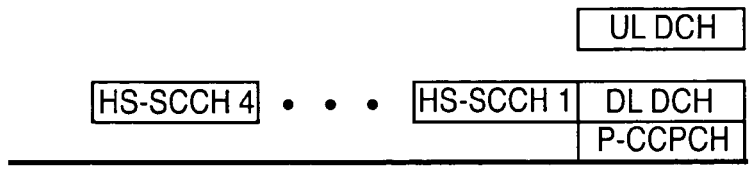
FIG. 3 is a timeslot diagram for channel monitoring in accordance with a multi-frame channel allocation.
Figure 3:
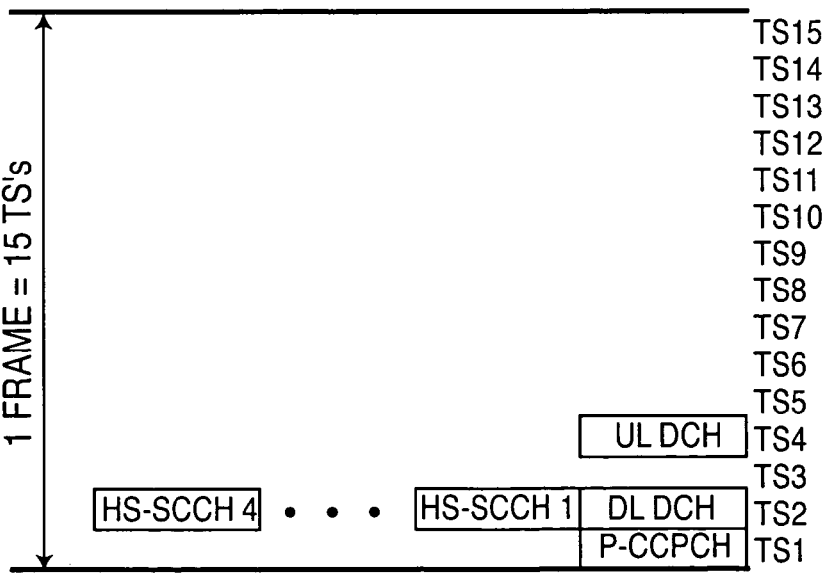

It is noted that TDD allows for multi-frame allocations, i.e., a channel does not occur regularly every frame, but every two, four, eight, etc. frames instead. The methods described above in connection with FIGS. 1 and 2 naturally extend to these cases, as shown in FIG. 3.

Figure 4:
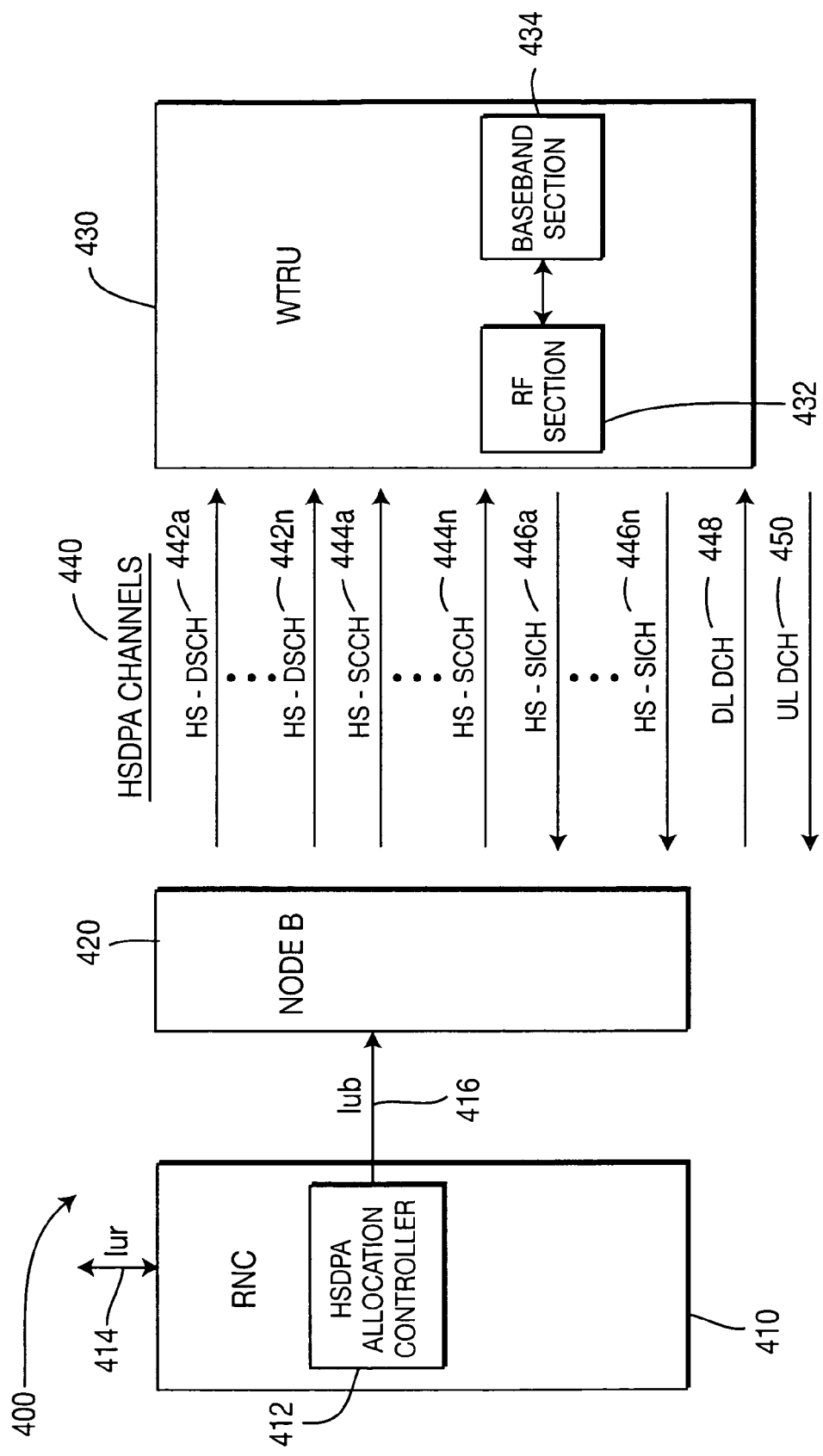
FIG. 4 is a diagram of a system constructed in accordance with the present invention.

FIG. 4 shows a system 400 constructed in accordance with the present invention. The system 400 includes a RNC 410, a Node B 420, and a WTRU 430. The RNC 410 includes a HSDPA allocation controller 412. The RNC 410 communicates with other RNCs in the UMTS system via an Iur interface 414 and communicates with the Node B 420 via an Iub interface 416. The WTRU 430 includes a RF section 432 and a baseband section 434, which communicate with each other internal to the WTRU 430.

The Node B 420 communicates with the WTRU 430 through a set of HSDPA channels 440. The channels 440 include one or more HS-DSCHs 442a-442n, one or more HS-SCCHs 444a-444n, one or more HS-SICHs 446a-446n, a DL DCH 448, and a UL DCH 450. The allocation controller 412 allocates the channels to be used by the WTRU 430 by selecting the channels from the set 440. The channel allocations are performed in accordance with any of the methods described above. The system 400 is useable with any of those methods without additional modification.

It should be noted that while the present invention has, for simplicity, been described in the context of UMTS type technology, it is important to note that the present invention may be implemented in any type of wireless communication system. Purely by way of example, the present invention may be implemented in UMTS-FDD, UMTS-TDD, TD-SCDMA, CDMA2000 (EV-DO and EV-DV) or, as mentioned, any other type of wireless communication system.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for maximizing battery efficiency of a wireless transmit/receive unit (WTRU), comprising:

identifying a plurality of high-speed shared control channels (HS-SCCHs) associated with the WTRU, wherein each of the HS-SCCHs are transmitted over a plurality of discrete time intervals;

allocating by a high-speed downlink packet access (HS-DPA) allocation controller to a single discrete time interval; and instructing the WTRU to monitor each of the plurality of HS-SCCHs in the single discrete time interval, wherein monitoring the single discrete time interval minimizes a length of time that the WTRU's radio frequency part is powered on maximizing battery efficiency.

2. The method according to claim 1, wherein the single discrete time interval used to monitor the HS-SCCHs is used by another channel.

3. The method according to claim 2, wherein the other channel is a primary common control physical channel.

4. The method according to claim 2, wherein the other channel is a downlink dedicated channel.

5. The method according to claim 1, further comprising:

allocating an uplink high-speed shared information channel and another uplink transmission to the single discrete time interval.

6. The method according to claim 5, wherein said allocating is performed after the WTRU decodes a high-speed downlink shared channel transmission.

7. The method according to claim 5, wherein the single discrete time interval is also used by an uplink dedicated channel.

8. A radio network controller (RNC) for maximizing the battery efficiency of a wireless transmit/receive unit (WTRU) that allocates a plurality of high-speed shared control channels (HS-SCCHs) to be transmitted over a plurality of discrete time intervals comprising:

a high-speed downlink packet access HSDPA allocation controller, the HSDPA allocation controller allocating each of the plurality of HS-SCCHs monitored by the WTRU to a single discrete time interval and the WTRU monitoring each of plurality of HS-SCCHs during the single discrete time interval, wherein monitoring the single discrete time interval minimizes a length of time that the WTRU's radio frequency part is powered on maximizing battery efficiency.

9. The RNC according to claim 8, wherein the HSDPA allocation controller allocates all HS-SCCHs monitored by the WTRU to the single discrete time interval in which the WTRU receives a downlink dedicated channel.

10. The RNC according to claim 8, wherein the HSDPA allocation controller allocates a high-speed shared information channel (HS-SICH) to an uplink discrete time interval in which the WTRU sends an uplink dedicated channel, the HS-SICH being allocated after the WTRU decodes a high-speed downlink shared channel.

* * * * *